United States Patent
Van Gorder, Jr. et al.

[11] Patent Number: 5,341,894
[45] Date of Patent: Aug. 30, 1994

[54] GOLF CART FOR AMBULATORY DISADVANTAGED GOLFERS

[76] Inventors: John E. Van Gorder, Jr., 11249 Marilyn Way, Mokena, Ill. 60448; Gary A. Piotrowski; Barnard Piotrowski, Jr., both of 216 N. Marquette Rd., Spring Valley, Ill. 61362

[21] Appl. No.: 50,970

[22] Filed: Apr. 22, 1993

[51] Int. Cl.$^5$ .............................. B60K 1/00
[52] U.S. Cl. ..................... 180/271; 180/79; 180/272; 180/287; 180/907; 280/DIG. 5; 297/DIG. 10
[58] Field of Search ........... 180/271, 272, 287, 6.5, 180/907, 69.6, 79; 280/250.1, 304.1, DIG. 5; 297/DIG. 10, DIG. 4

[56] References Cited
U.S. PATENT DOCUMENTS

| | | | |
|---|---|---|---|
| 3,807,795 | 4/1974 | Weant et al. | 180/6.5 |
| 5,090,513 | 2/1992 | Bussinger | 180/271 |
| 5,193,633 | 3/1993 | Ezenwa | 180/271 |

*Primary Examiner*—Mitchell J. Hill
*Attorney, Agent, or Firm*—Terry M. Gernstein

[57] ABSTRACT

A golf cart includes a seat that can be adjusted in several planes whereby an ambulatory disadvantaged golfer can safely operate the golf cart by himself and can be supported in a position to execute a golf shot. The golf cart positions the golfer so that his or her golf swing will not be inhibited by the golf cart and the golfer can adjust his stance to accommodate various terrains and golf club lengths. The golf cart has the steering wheel on the right hand side and the seat swings 90° from a forward facing driving orientation into a sideways facing playing orientation, then adjusts up or down, moves forward, and tilts to keep the golfer's legs and feet out of the way of the golf swing. Safety systems prevent movement of the seat when the cart is in motion and prevent movement of the cart when the seat is not in the driving orientation, and the cart braking and accelerator systems are operated using a single hand lever.

17 Claims, 14 Drawing Sheets

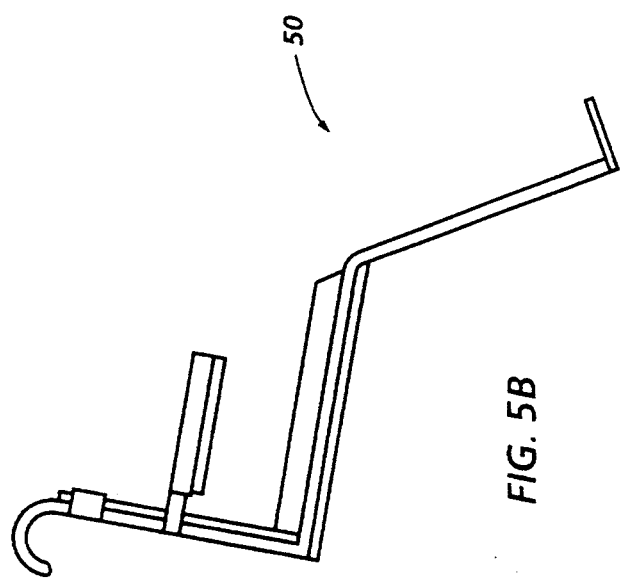
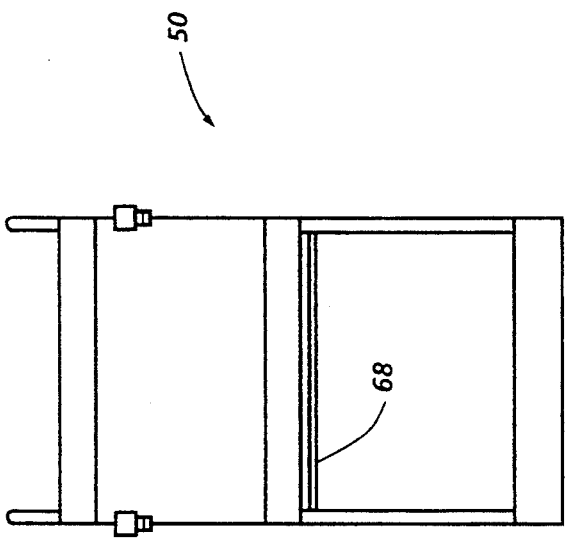
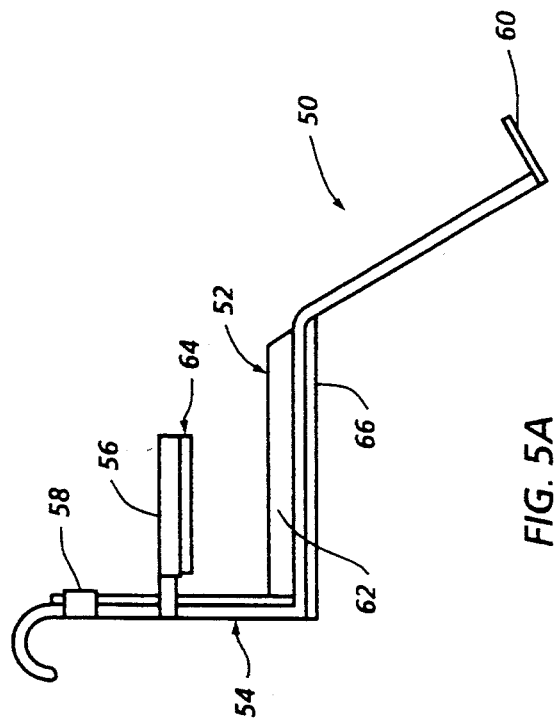

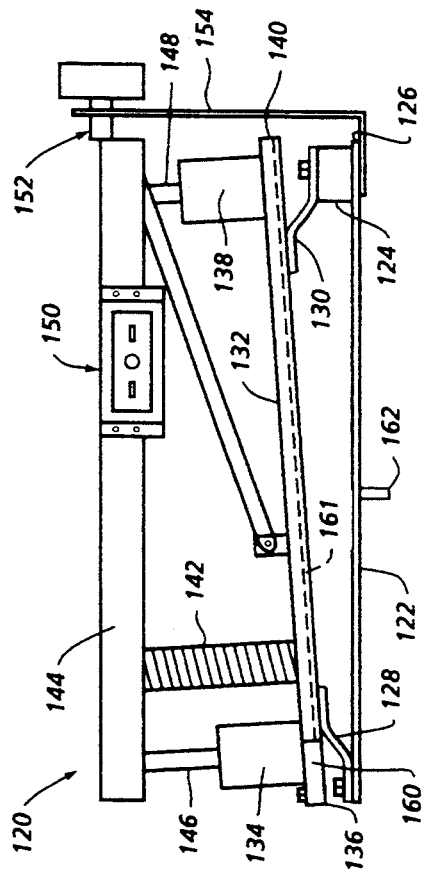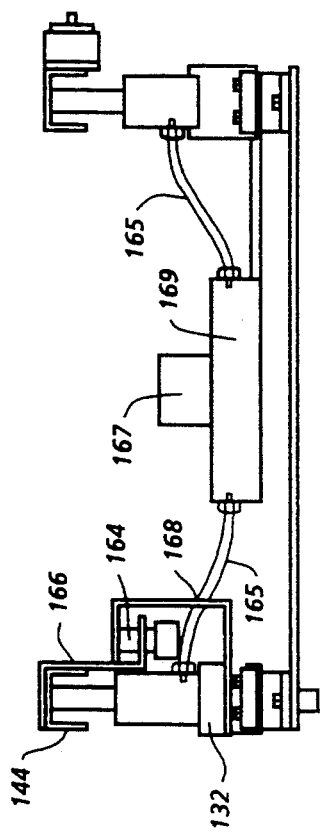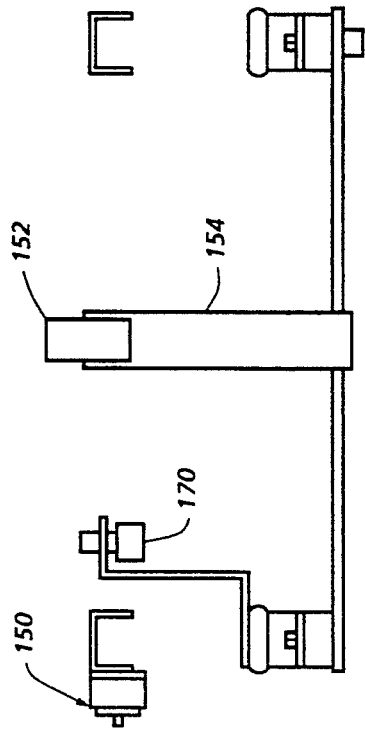
FIG. 7C
FIG. 7D
FIG. 7A
FIG. 7B

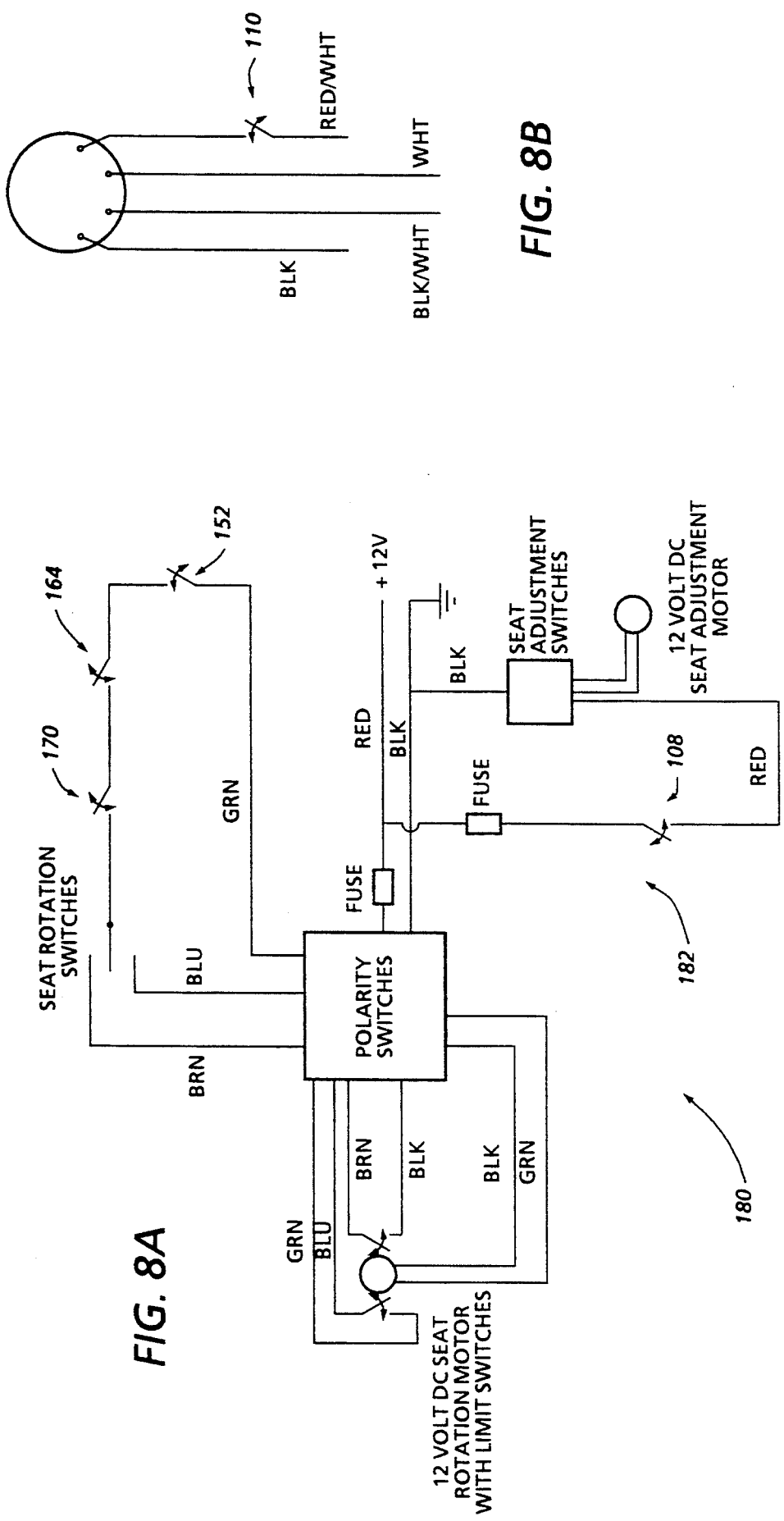

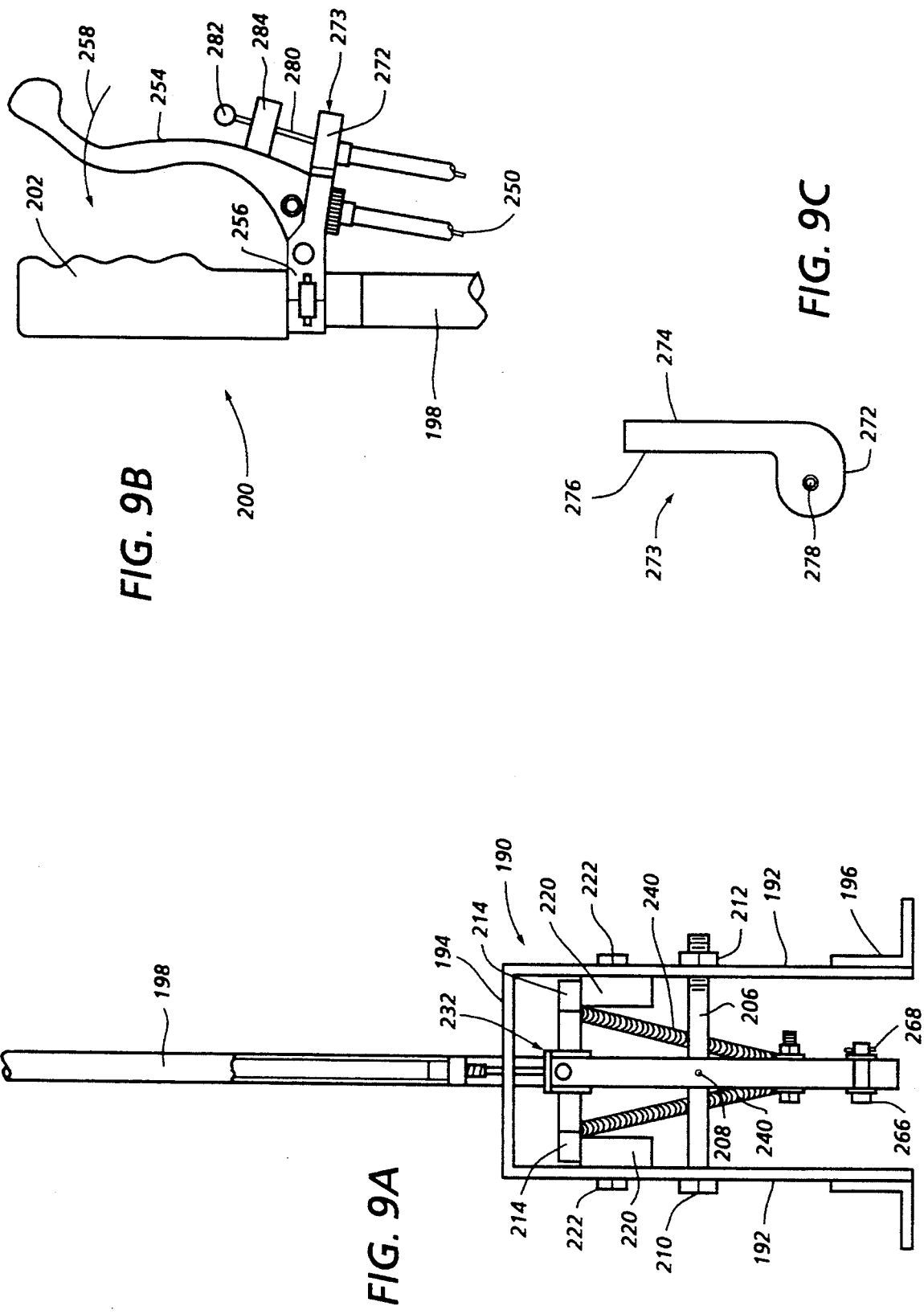

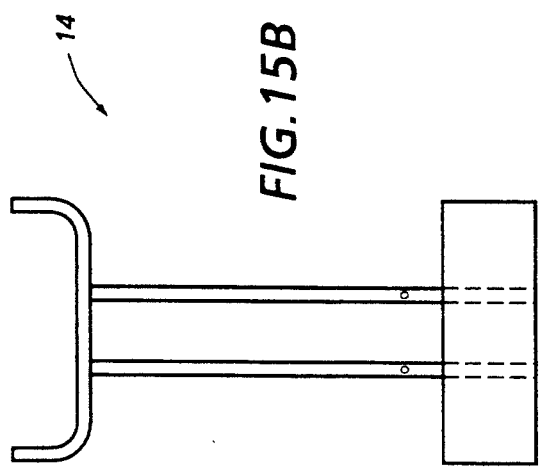
FIG. 15B
FIG. 15A
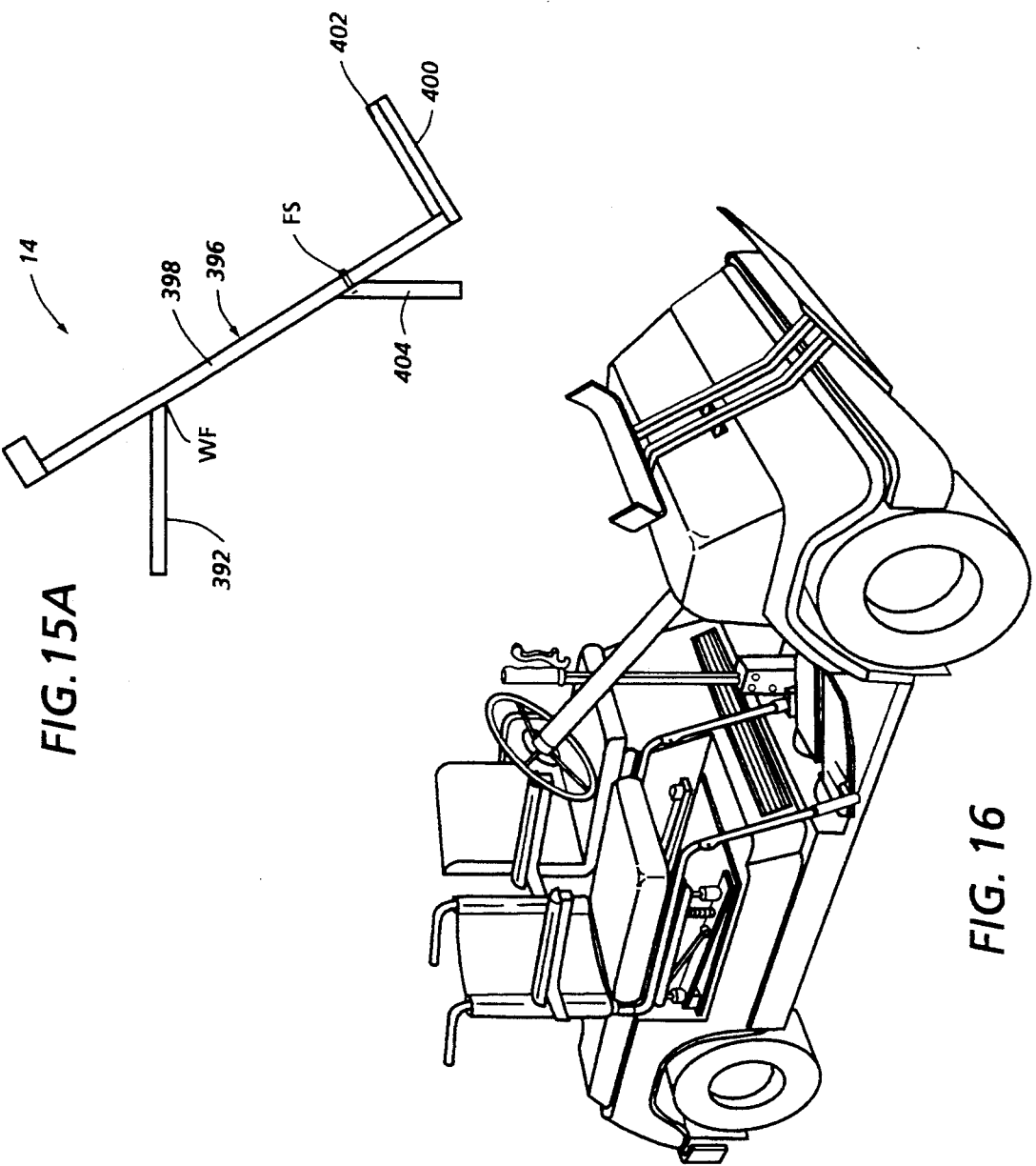
FIG. 16

GOLF CART FOR AMBULATORY DISADVANTAGED GOLFERS

TECHNICAL FIELD OF THE INVENTION

The present invention relates to the general art of land vehicles, and to the particular field of golf carts.

BACKGROUND OF THE INVENTION

Today, many people enjoy extremely active lives even though they depend on a wheelchair or some other form of assistance to move about. As used herein, the term "ambulatory disadvantaged" will refer to such disadvantaged persons. These people have learned that their disadvantage need not prevent them from engaging in most, if not all, activities. These activities often include sports, such as golf.

Ambulatory disadvantaged persons generally require a golf cart to participate in that sport. However, golf carts have heretofore been designed for use by those having full use of their legs. That is, in order to use a golf cart, one has to climb out of the cart, play the golf shot and then climb back into the cart. Once in the cart, most golf carts require a user to operate foot pedals, for braking and/or acceleration, or the like, thereby requiring the use of one's legs. These requirements are not appropriate for all ambulatory disadvantaged persons.

Therefore, there is a need for a golf cart that will permit an ambulatory disadvantaged person to participate in the sport of golf. However, as can be understood from the above discussion, merely assisting the user in entering or leaving the golf cart is not sufficient for all these individuals. Some such individuals may need support while they are executing a golf shot. Further, mere support may not be sufficient for all those who wish to play golf. If the support, in some way, inhibits or prevents the person from playing to his or her full potential, such support may frustrate the golfer. Therefore, there is a more specific need for a golf cart that can support an ambulatory disadvantaged golfer while he or she executes a golf shot, but provides such support in a manner that does not interfere with the execution of the golf shot. Still further, in this vein, if the golf cart does not permit the golfer to alter his or her swing or stance to account for the terrain, such as a sidehill lie or the like, then the golfer will be prevented from playing as well as he or she can play and may frustrate that golfer. Therefore, there is a more specific need for such a golf cart that can permit the golfer to adjust his or her swing and stance to various terrain as well as to various golf club lengths.

Thus, there is a need for a golf cart that can support a disadvantaged person while he or she is executing a golf shot as well as assist that person in entering and leaving the golf cart.

Still further, many such persons may want the option of playing golf alone. However, as mentioned above, most golf carts do not permit this due to requirements of controlling and operating the cart using one's legs and/or feet. Therefore, there is a need for a special golf cart that will permit an ambulatory disadvantaged person to operate and control that cart, yet to be supported while he or she executes a golf shot.

Of course, safety in operating any golf cart must be of concern. This is especially so for a special golf cart used by ambulatory disadvantaged person since that person will have to complete many more operations to execute a golf shot than other persons who are not similarly disadvantaged, and may be located so that he or she can not quickly set an emergency brake if the cart somehow begins to move while he or she is executing a golf shot.

Since all people are different, and each has his or her own preferences with regard to comfort, to be commercially successful, a golf cart should be able to accommodate such variations. This requirement applies to a golf cart that is intended for use by disadvantaged persons as well as other golfers. Therefore, there is a need for a golf cart that will be used by disadvantaged golfers and which can be modified by each user to suit his or her particular needs and desires with regard to comfort.

OBJECTS OF THE INVENTION

It is a main object of the present invention to provide a golf cart that can be used by ambulatory disadvantaged golfers.

It is another object of the present invention to provide a golf cart that can be used by ambulatory disadvantaged golfers which will assist the golfer in entering and leaving the golf cart.

It is another object of the present invention to provide a golf cart that can be used by ambulatory disadvantaged golfers which will support the golfer while he or she executes a golf shot.

It is another object of the present invention to provide a golf cart that can be used by ambulatory disadvantaged golfers which can safely be operated and controlled by the disadvantaged golfer by himself or herself.

It is another object of the present invention to provide a golf cart that can be used by ambulatory disadvantaged golfers which will not interfere with the golfer while he or she executes a golf shot.

It is another object of the present invention to provide a golf cart that can be used by ambulatory disadvantaged golfers that will not interfere with a golfer's stance as he or she executes a golf shot and will accommodate various terrains and golf club lengths.

It is another object of the present invention to provide a golf cart that can be used by ambulatory disadvantaged golfers that can be modified to fit a particular golfer's requirements with regard to comfort.

SUMMARY OF THE INVENTION

These, and other, objects are achieved by a golf cart that includes a seat which has multiple degrees of movement and means so that one person can safely operate and control those motions as well as overall cart movement. Specifically, the golf cart can be operated in such a manner by an ambulatory disadvantaged person whereby such golfer can achieve his or her full potential as a golfer, that is, the golf cart will not inhibit or interfere with the golfer's game.

In particular, the golf cart embodying the present invention includes a right-hand side located steering mechanism with a single hand control that operates the accelerator system and the brake system of the cart. This will permit one person, who may not have use of his or her legs, to operate the cart. Still further, the golf cart includes a seat that can rotate in a horizontal plane with respect to the golf cart as well as tilt in a vertical plane and adjust with respect to various elements in the seat itself. The cart has safety features which prevent operation of various controls, especially those that move the cart, while other adjustments are being made, such as moving the seat. The adjustments are made to accommodate various golfers, various terrain and various club lengths, yet the golfer's legs as well as the cart, are out of the way during a golf shot.

In this manner, a golfer who may be disabled can safely operate the golf cart himself, yet not have the cart in any way inhibit his or her game.

BRIEF DESCRIPTION OF THE DRAWING FIGURES

Figure 4:
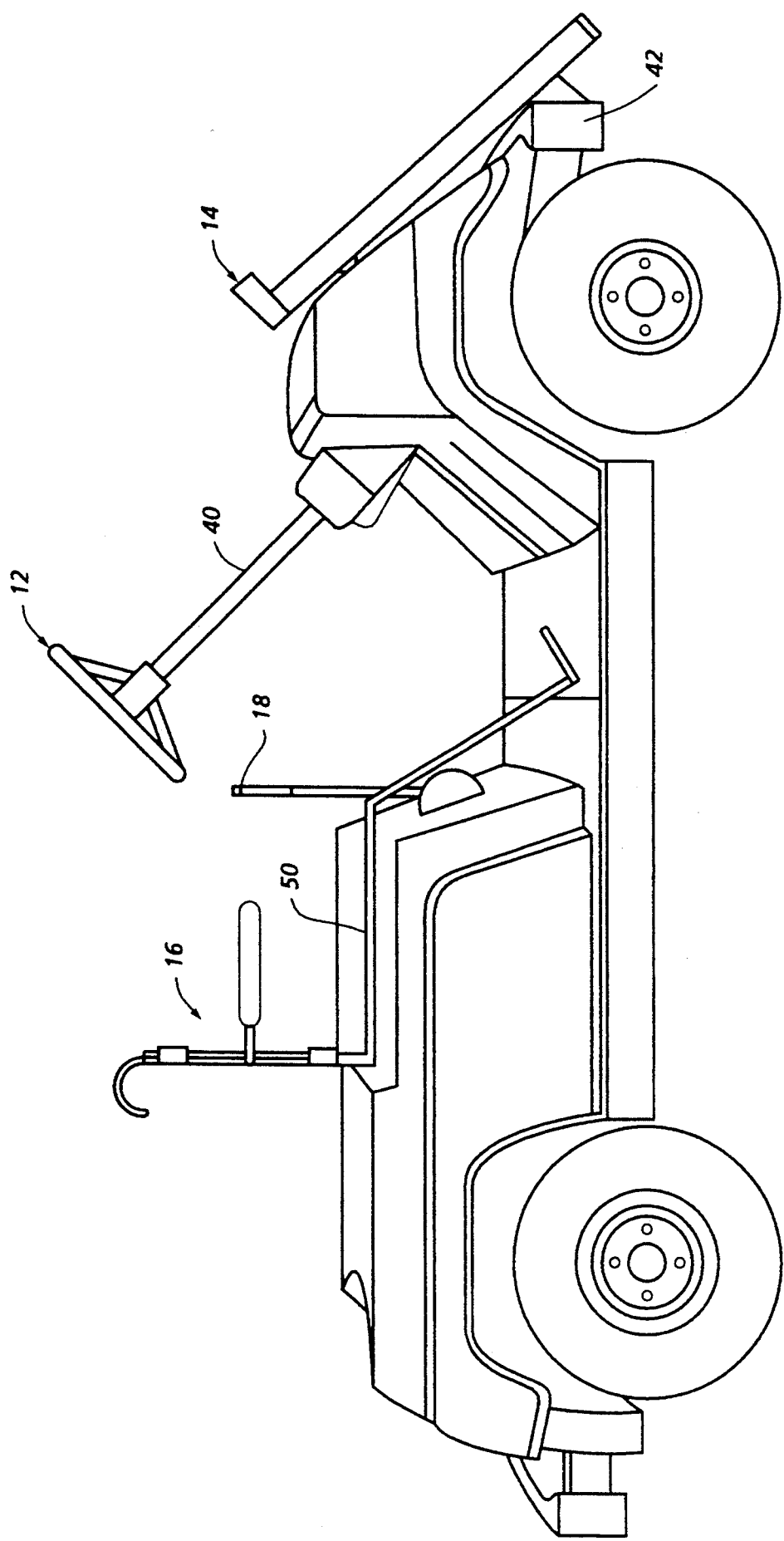
Figure 6B:
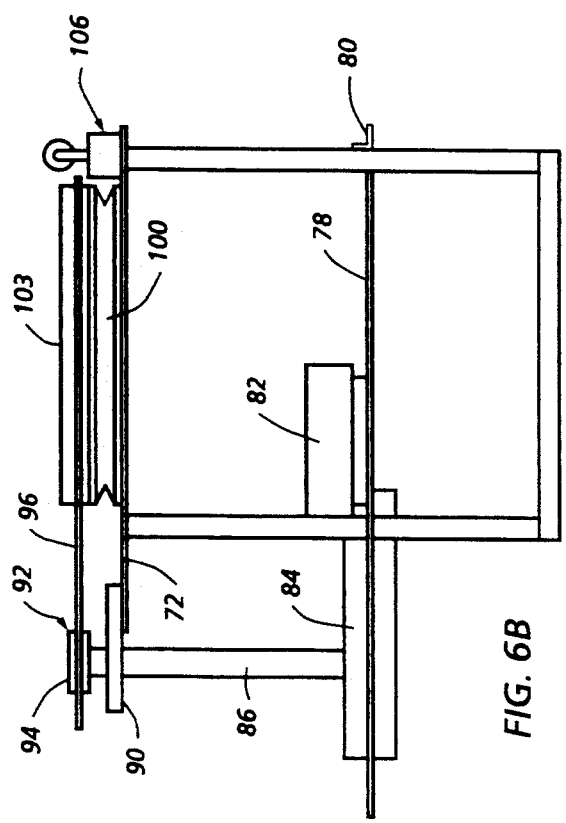
Figure 6D:
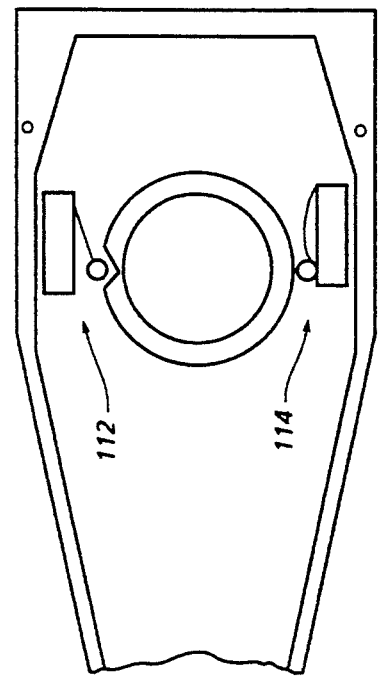
Figure 6A:
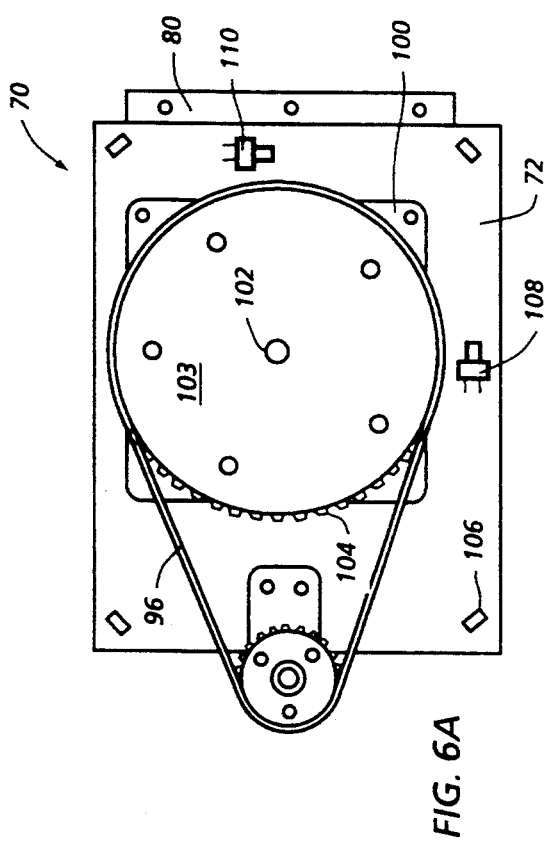
Figure 6C:
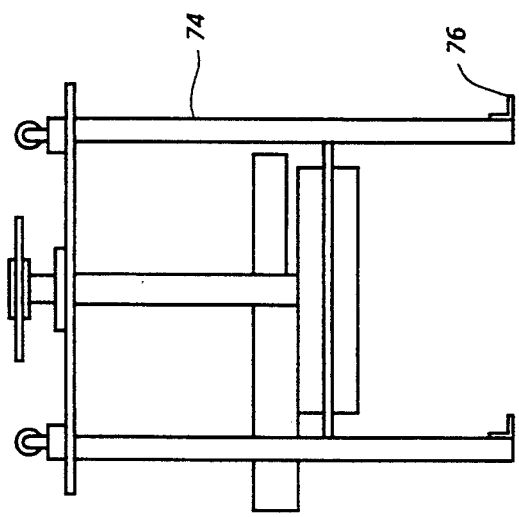

FIG. 4 is a right side elevational view of the golf cart with the seat unit and cart controls shown, FIG. 5A is a side elevational view of a seat used in the present golf cart in a horizontal orientation, FIG. 5B is a side elevational view of the seat used in the present golf cart in a tilted orientation, FIG. 5C is a front elevational view of the seat used in the present golf cart, FIG. 6A is a top plan view of the seat rotation unit used in the present golf cart, FIG. 6B is a side elevational view of the seat rotation unit, FIG. 6C is a rear elevational view of the seat rotation unit, FIG. 6D is a top plan view of the gear assembly housing with the top cover removed, FIG. 7A is a left side elevational view of a seat adjustment unit of the present invention, FIG. 7B is a top plan view of the seat adjustment unit.

FIG. 7C is a front elevational view of the seat adjustment unit.

FIG. 7D is a rear elevational view of the seat adjustment unit,

FIG. 8A is a circuit diagram of the electrical system used in the golf cart of the present invention to control seat movement.

FIG. 8B is a schematic illustrating the installation of a momentary push switch into the circuitry common to golf carts.

FIG. 9A is a front elevational view of a brake unit and housing used in the golf cart of the present invention.

FIG 9B is a right side elevational view of a hand grip unit used to control acceleration and braking of the golf cart.

FIG. 9C is a top elevational view of a mounting element used in the hand grip element shown in FIG. 9B.

Figure 10B:
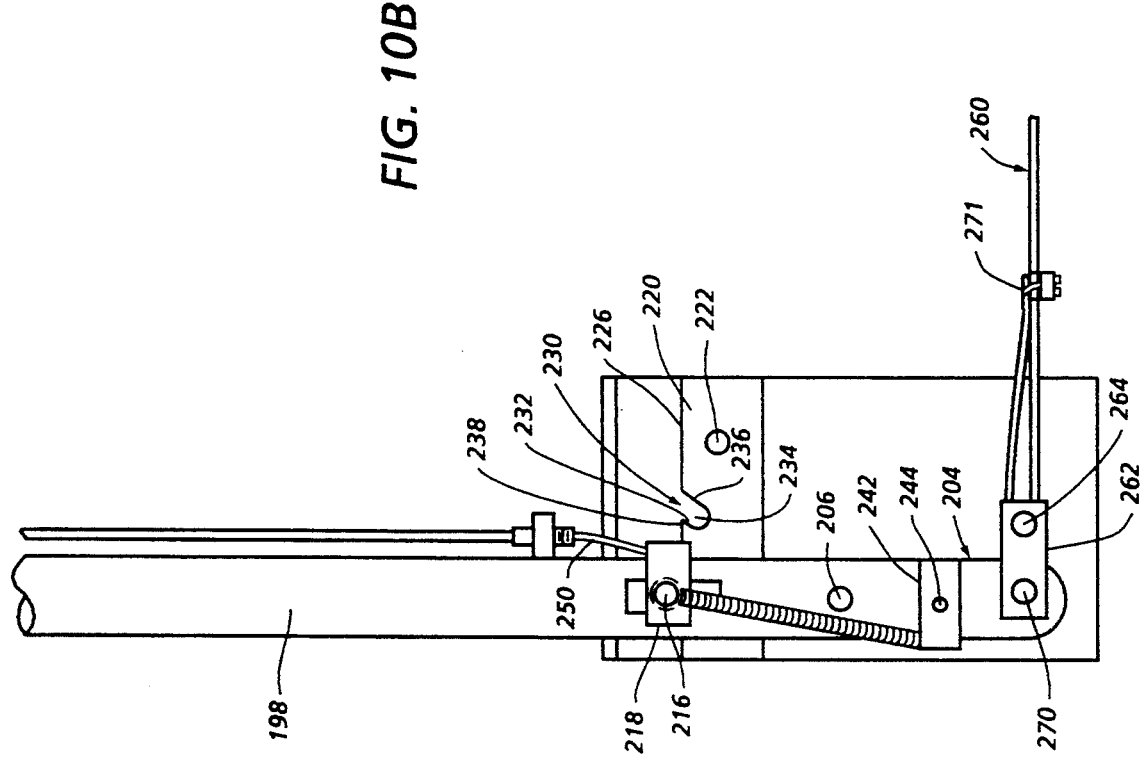
Figure 10A:
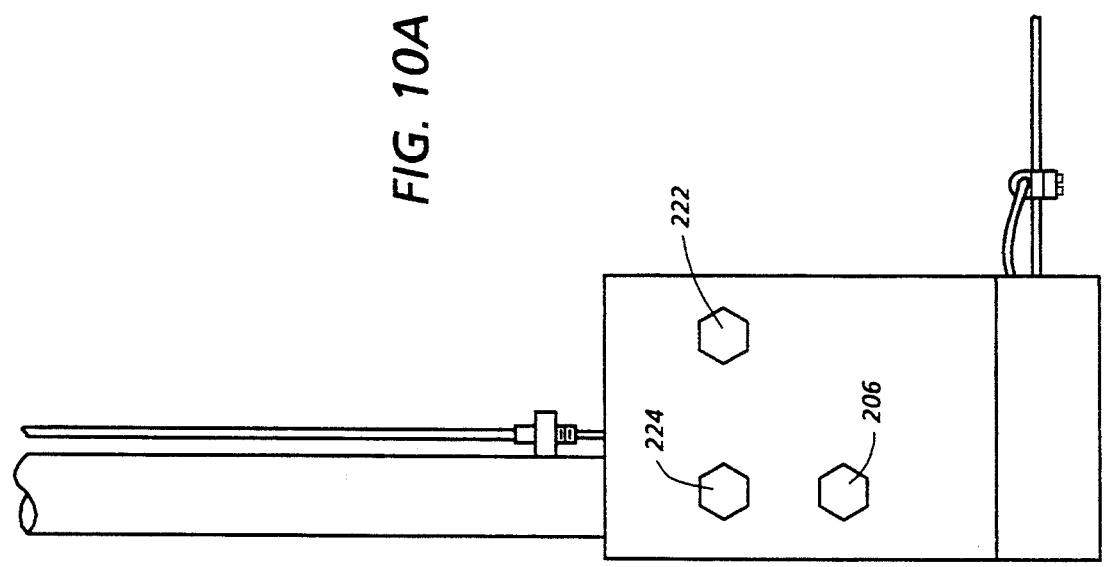

FIG. 10A is a right side elevational view of the brake unit housing.

FIG. 10B is a cutaway side elevational view of the brake unit housing.

Figure 11:
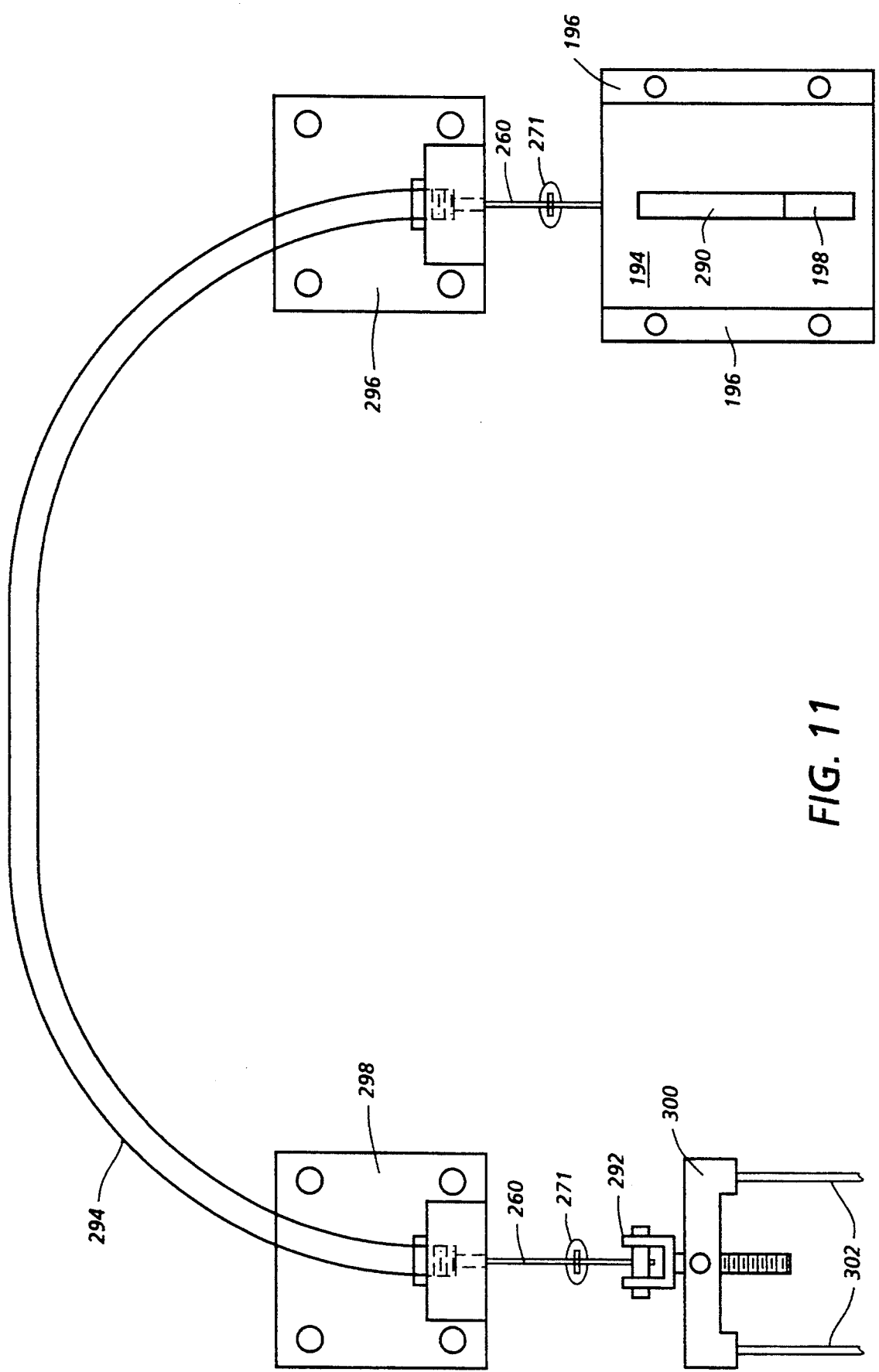

FIG. 11 is a top plan view of a brake cable layout used in the golf cart of the present invention.

Figure 12:
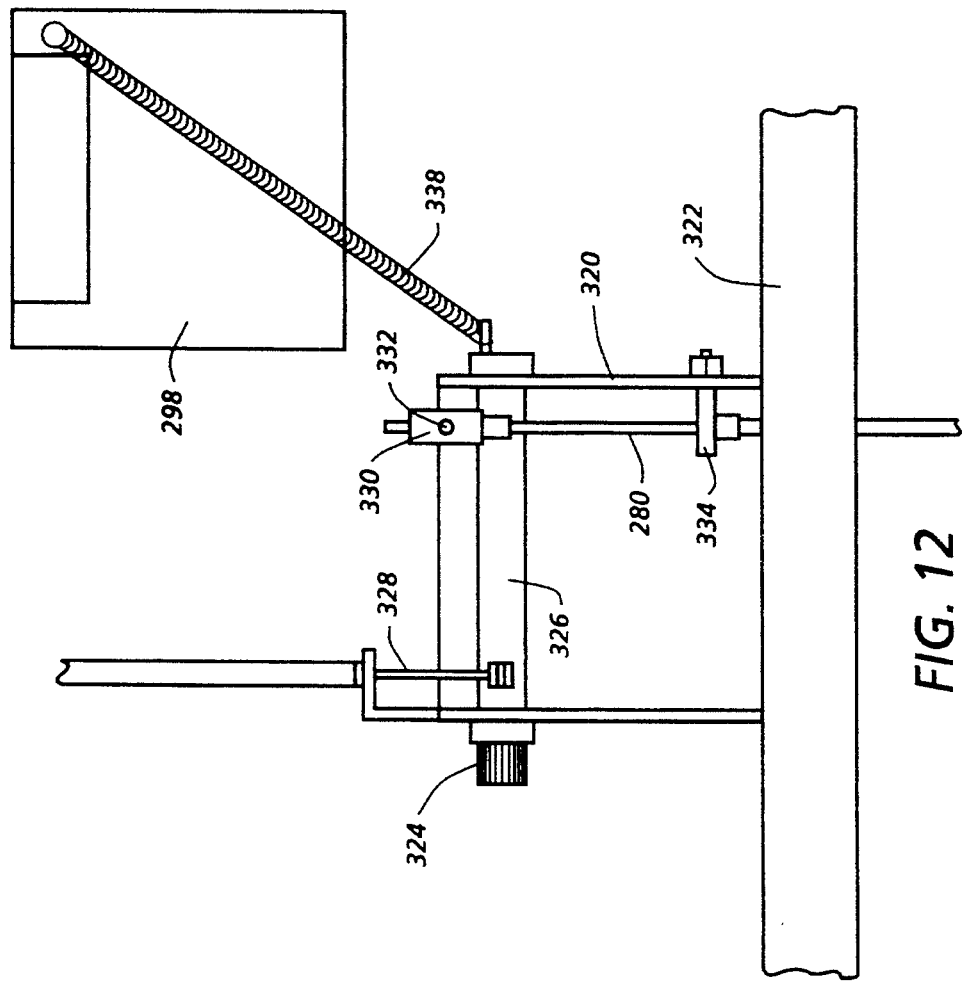

FIG. 12 is a top plan view of the connection of the control cables to the accelerator system of the golf cart.

Figure 13B:
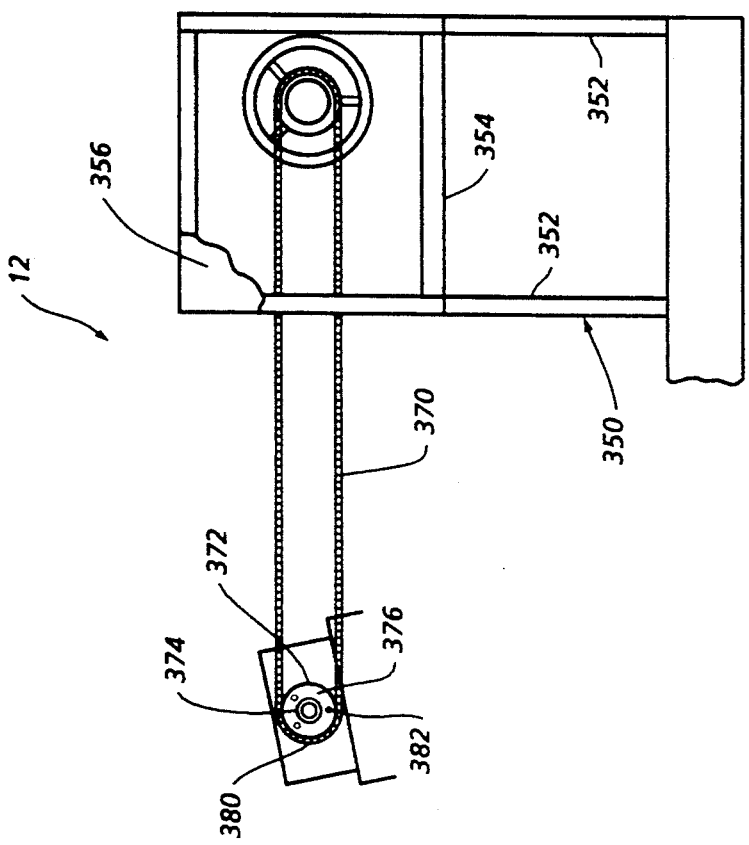
Figure 13A:
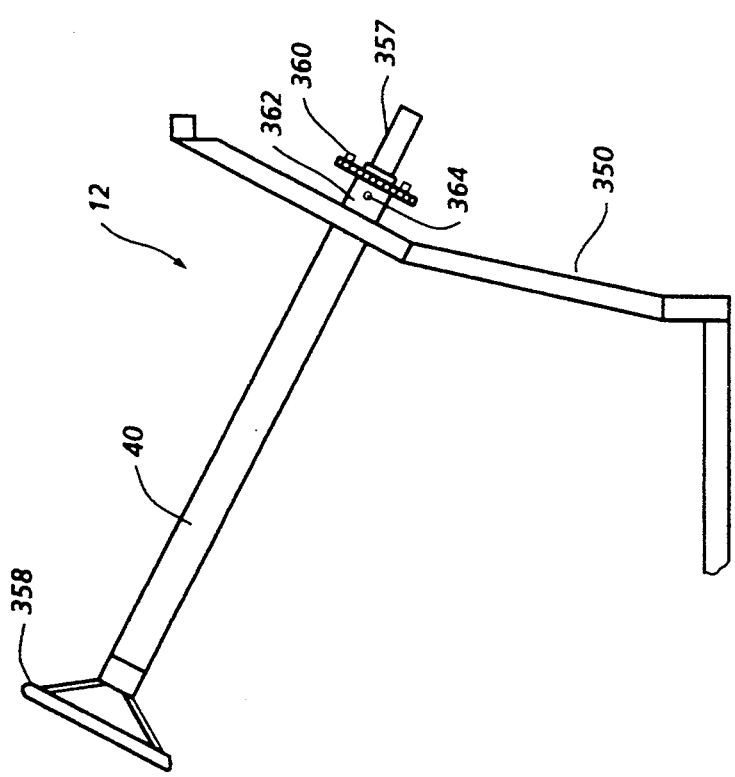

FIG. 13A is a right side elevational view of the steering assembly of the golf cart of the present invention.

FIG. 13B is a rear elevational view thereof, with a mounting panel partially cutaway for clarity of illustration.

Figure 14:
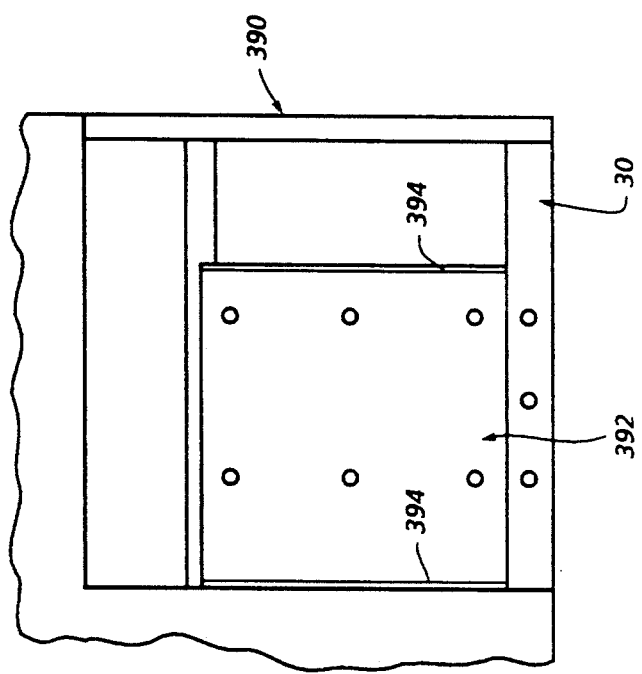

FIG. 14 is a schematic showing part of the frame unit.

FIG. 15A is a right side elevational view of a golf club mounting rack used on the golf cart of the present invention.

FIG. 15B is a front elevational view of the golf club rack.

FIG. 16 is a front, top and side perspective view of the golf cart with the seat unit installed.

Figure 17:
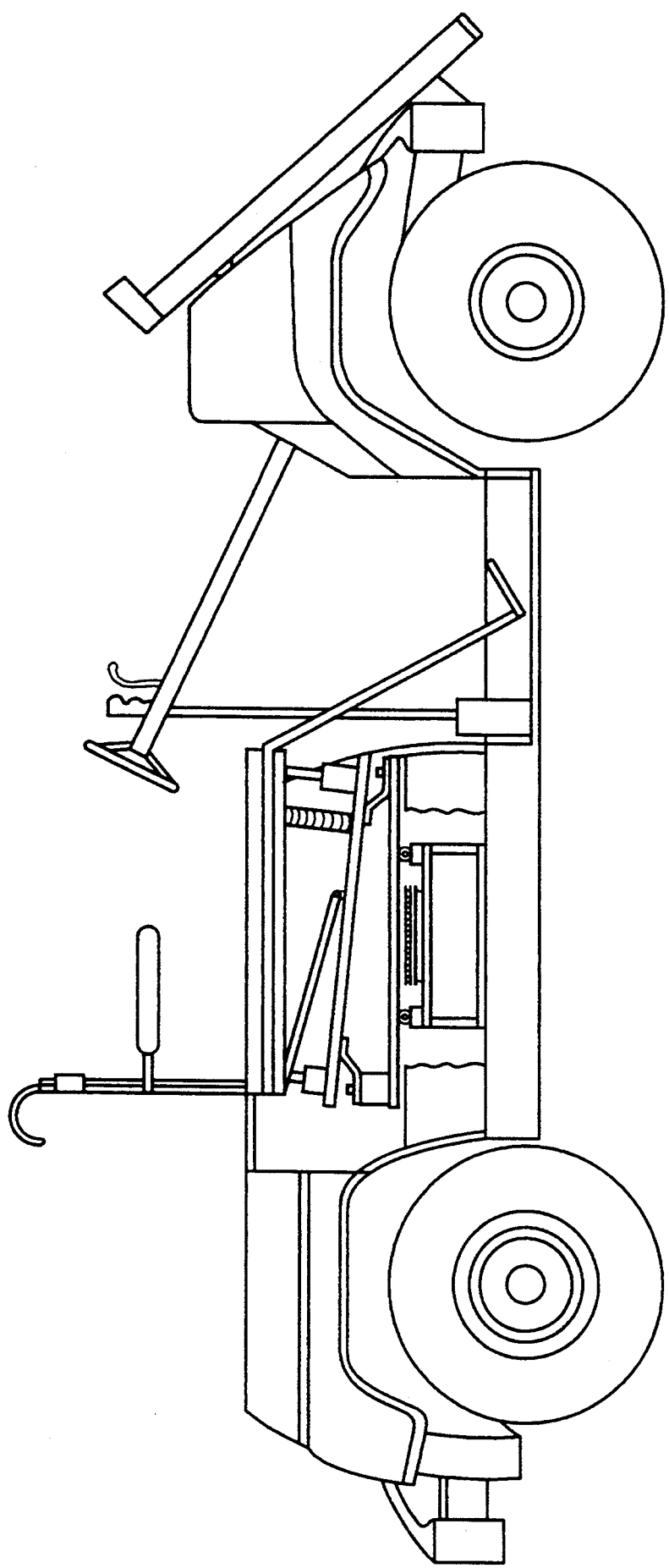

FIG. 17 is a right side elevational view of the golf cart with the seat unit installed.

DETAILED DESCRIPTION OF THE PREFERRED EMBODIMENT OF THE INVENTION

Figure 1:
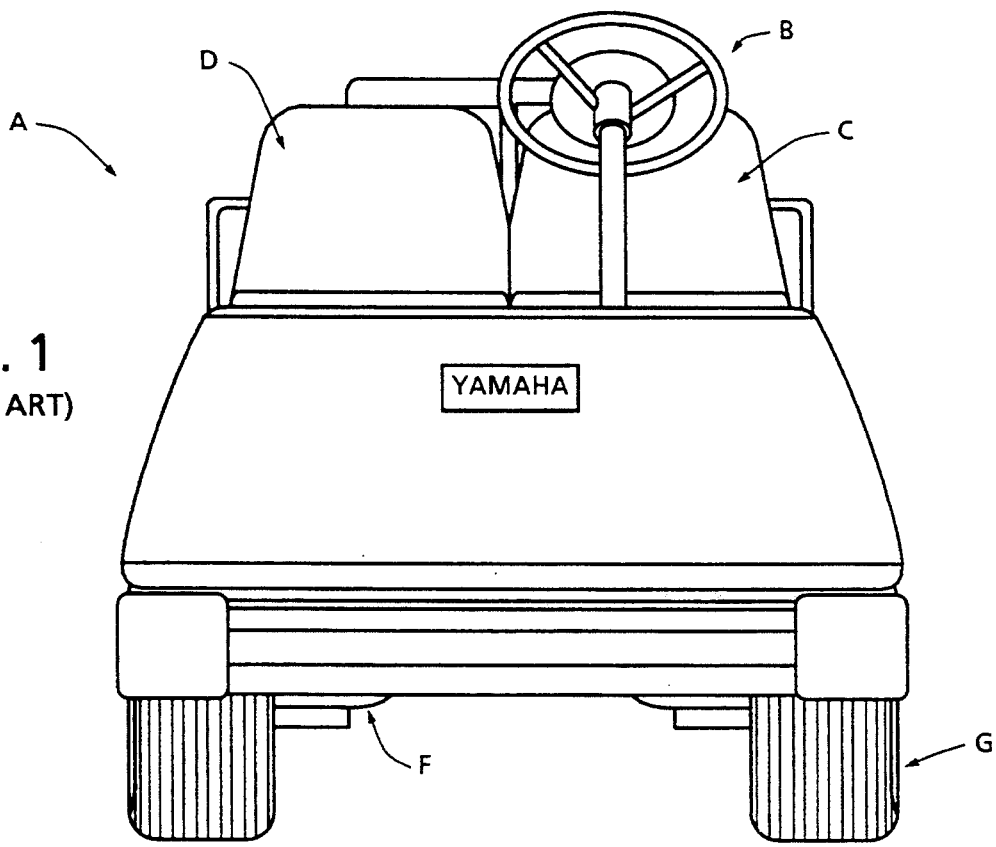
FIG. 1 is a front elevational view of a prior art golf cart.

Shown in FIG. 1 is a prior art golf cart A having a steering wheel B on the left hand side thereof and seats C and D located therebehind, with the driver being located in seat C. A rack E mounts golf clubs. The cart A has a frame unit (partially seen at F in FIG. 1) as well wheels G mounted thereon in the manner common to golf carts. A drive means (not shown in FIG. 1), such as an internal combustion engine, or an electrically driven engine is used to move the cart. The golf cart of the present invention is a modified form of this golf cart, and, unless otherwise stated, the systems of the golf cart A are used in the golf cart of the present invention. Thus, for example, the motor commonly used in golf cart A is used in the golf cart of the present invention, as is the transmission gearing, wheels and wheel systems and the like. The golf cart also includes an ignition circuit that connects a power source, such as a battery, to the drive motor of the cart to activate, or operate, that drive motor. In the case of an electric cart, the power source is used to drive the wheels; whereas, in the case of an internal combustion engine, the power source is used to activate that internal combustion engine.

Figure 2:
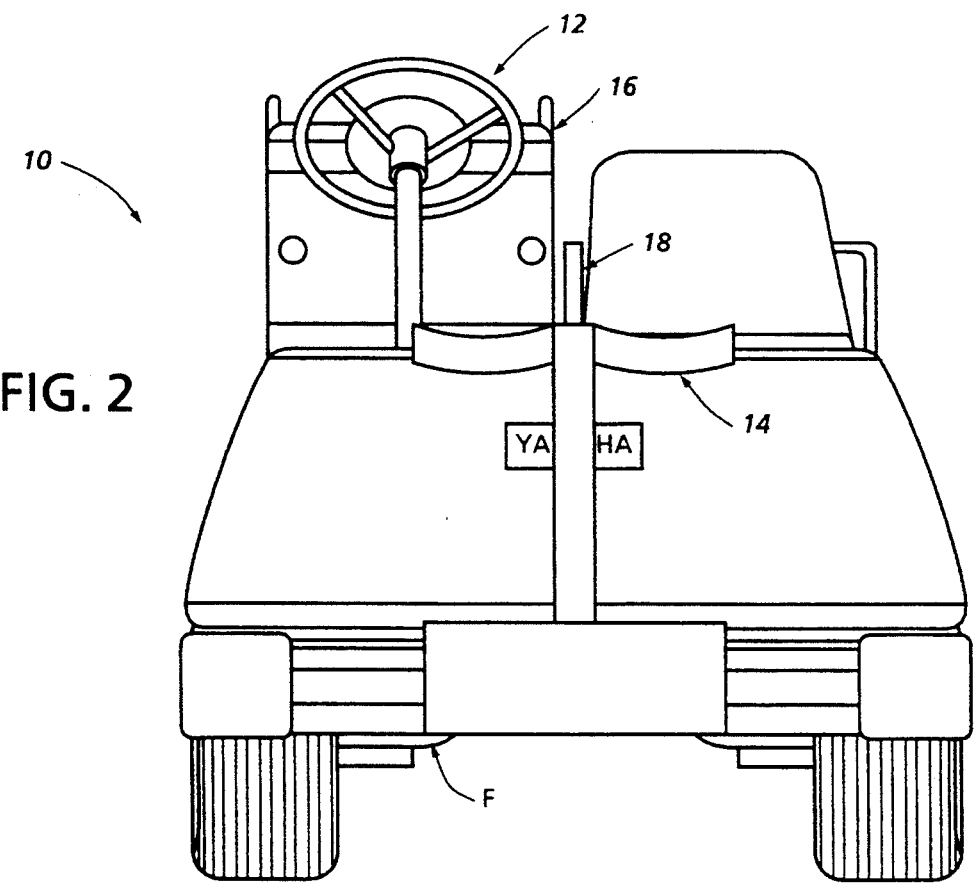
FIG. 2 is a front elevational view of a golf cart embodying the present invention.

FIG. 2 is a front elevational view of the golf cart 10 of the present invention. Golf cart 10 includes a steering system 12 on the right hand side thereof, a golf club support system 14 on the front thereof, a special seat system 16 and a cart control system 18. These systems will be individually discussed below.

Figure 3:
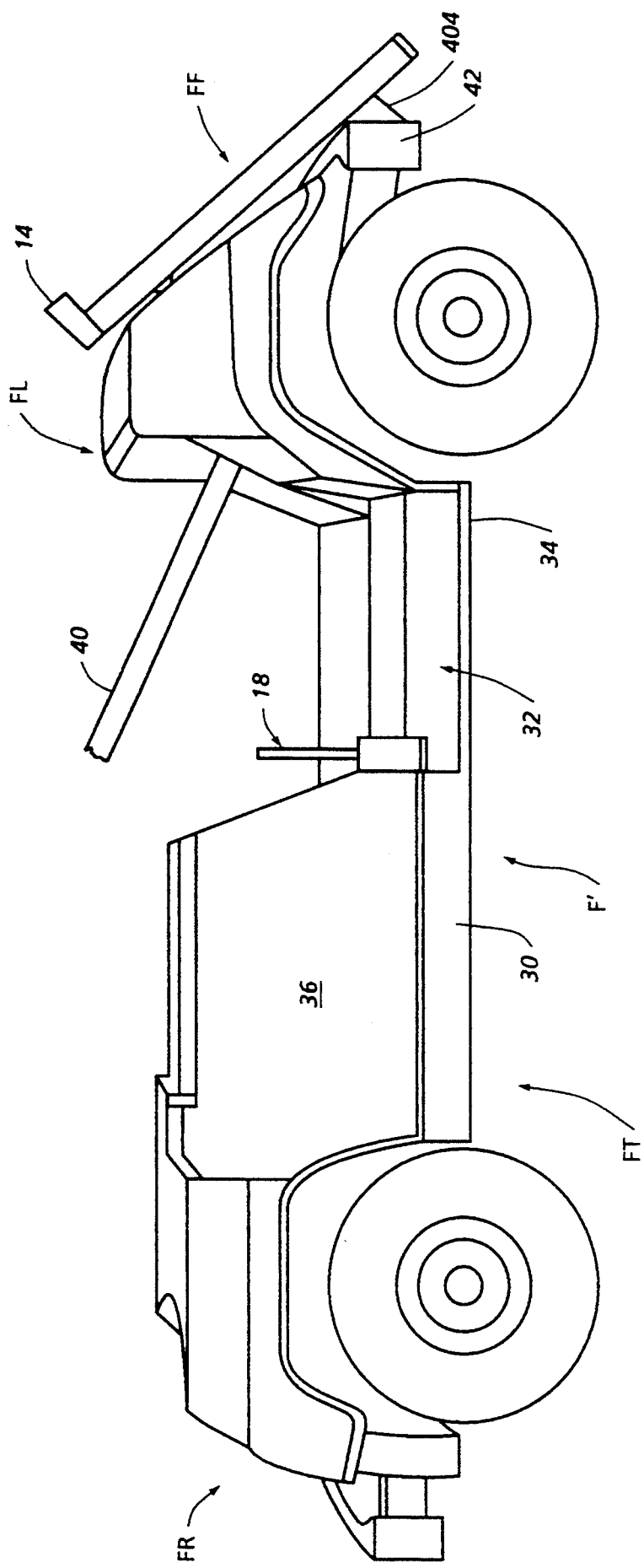
FIG. 3 is a right side elevational view of the golf cart of the present invention showing the frame unit modified in accordance with the present invention.

The golf cart frame unit F is modified to accommodate the above-mentioned systems, and part of these modifications are shown in FIG. 3 as frame unit F' that includes a front end FF, a rear end FR, a left side FL and a right side FT. The steel channel that originally supported the side of the cart has been cut and removed. It was then replaced with steel channel 30 and serves as the main support for the seat system. A drop floor area 32 is defined in the cart, and has one inch square tubing 34 added to support the dropped floor. Area 36 of the frame system and body F' adjacent to the seat system is cut out as shown in FIG. 3o Also shown is the steel channel supporting structure which borders the cutout area and provides support for the body.

Steering column 40 is shown extending towards the seat area, with club rack system 14 and cart control system 18 also being indicated in FIG. 3 for reference. Steel square tubing is used to mount to the front bumper 42 and to extend through the front body panel and is bolted to the supporting frame for the front body panel.

FIG. 4 illustrates the assembled cart with seat system 16 in place behind the steering system 12 and adjacent to the control system 18.

Seat System 16—general description

The seat system is located on the right side of the cart and includes three units: a lower rotational unit, a middle adjustment unit and a seat unit. The seat unit is a wheelchair seat providing support and stability for the golfer. A replaceable seat cushion reduces the risk of pressure sores. A seat height of twenty-four inches has been determined by the inventors to be appropriate for proper club swing, and adjustments to accommodate various users can include shimming the seat base, leg and backrest adjustments and cushion height selection can be made to further adjust the seat height. In the preferred form, the seat adjustment unit is an electric car seat mechanism which permits a reasonable golf club swing, proper ball line up and compensates for various club lengths. The adjustment unit provides forward seat tilt (twelve degrees), forward movement (five inches) and height adjustment (two inches). To obtain an unobstructed golfing area, the rotation unit rotates the seat to the right in the preferred form of the golf cart 90° in ten seconds from a forward facing driving orientation (shown in FIG. 4) to a playing orientation facing perpendicular to the driving orientation and facing toward the right hand side of the cart. In general, the rotation unit includes a small electric motor, a gear assembly that is selected to provide the 90° rotation in ten seconds, a six inch central bearing with four roller bearings equally spaced around the central bearing and a chain drive system. Limit switches automatically stop the unit in the driving and playing orientations. These elements will be discussed in greater detail below.

Safety switching provides user safety, ease of use, and protection of the seat and cart from damage utilizing five momentary push switches. In the drive position and while rotating, the seat adjustment unit is rendered inoperable. Seat rotation out of the drive orientation immediately disables the ignition circuit associated with the golf cart thereby preventing accidental cart motor starting. In the playing orientation of the seat, the adjustment unit is enabled. Operating the adjustment unit disables the rotation unit until the seat is adjusted back to the playing position where the front seat is all the way up, the back of the seat is all the way down, and the set is all the way rearward. Mechanical stops allow proper positioning of the seat for rotation back to the driving position.

Seat

The seat unit 16 includes a seat 50 that is shown in FIGS. 5A-5C. For reference, the seat is oriented facing forward in FIG. 5A in a driving orientation and is rotated 90° into a sideways facing orientation in FIG. 5C. The seat is shown in a tilted orientation in FIG. 5B, and is moved in a horizontal plane with respect to the FIG. 5A orientation. The seat includes a seat element 52 and a back element 54 with arm rests 56 attached to the back element. A chest restraint strap 58 is also included as are foot rests 60. A cushion 62 is removeably mounted on the seat element. In one form of the invention, a seat control unit 64 is located on the distal end of one of the arm rests. However, other locations can be selected for this control unit. The seat includes a steel bottom plate 66 and a wood plate 68 interposed between the tubes on the seat as seen in the front view. The armrests are pivotally mounted so they can be moved out of the way for loading and unloading. The steel plate 66 is used to mount the seat on the remainder of the seat unit.

Rotation unit

Shown in FIGS. 6A-6D is a rotation unit 70 for moving the seat between the driving orientation and the playing orientation. The rotation unit includes a steel base plate 72 connected to a plurality of channel iron legs 74 having angle iron mounts 76 mounted thereon at the bottom ends thereof. A further steel plate 78 is mounted to the legs 74 as is a further angle iron mount 80. Angle iron 80 is connected to steel channel 30 to mount the seat to the cart frame unit, and angle iron 76 mounts to a steel plate in the cart frame F'.

The rotation unit includes an electric motor 82 mounted on the steel plate 78 and having a drive shaft connected to a gear assembly 84 also mounted on the steel plate 78. A drive shaft 86 is connected to the gear assembly for rotation therewith and extends upwardly from the gear assembly through a shaft support 90 mounted on the steel plate 72. A sprocket 92 is mounted on the drive shaft for rotation therewith by a sprocket mounting collar 94, and a drive chain 96 is connected to the sprocket 104 to be driven by rotation of that sprocket. A two-to-one ratio between the sprocket sizes can be used to produce this result.

A central bearing 100 is mounted on the steel plate 72 via four bolts. A bearing guide hole 102 is also shown. A steel disc 103 is mounted on the central bearing and a sprocket 104 connects the disc 103 to the drive chain to be rotated by the motor 82. Roller bearings 106 are also mounted on the steel plate as are momentary push switches 108 and 110.

The car seat unit is mounted on the steel disk 103, which also acts as a spacer for chain clearance, and the car seat unit includes an angle iron that contacts the momentary push switches to trigger those switches. The momentary push switches are of the type that close when the buttons are pressed and open when the buttons are not pressed. When the seat is in the driving orientation, the switch 110 is closed and completes the ignition circuit. When the seat is rotated out of the drive orientation, the circuit is opened and the engine cannot be started. Switch 108 is pressed when the seat is rotated into the playing orientation. When pressed, switch 108 closes and completes the circuit to the seat controls which are used to adjust seat tilt, forward seat movement and height adjustment. Therefore, the seat adjustments can only be used when the seat is in the playing orientation facing the side of the cart, and are disabled as soon as the seat rotates out of the playing orientation.

The placement of limit switches 112 and 114 are shown in FIG. 6D. These switches are located inside the cover of the gear box of the gear assembly and provide for automatic stopping of the drive and playing orientations of the seat. The location in these switches 112 and 114 creates the aforementioned 90° angular motion of the rotation means. Sprocket sizes were selected for the gears and sprockets discussed above whereby the 90° rotation can be achieved in ten seconds. The rotation unit is the lowermost unit in the seat unit and mounts directly to the cart frame 392 against the steel side channel 30.

Adjustment Unit

Seat adjustment unit 120 is shown in FIGS. 7A-7D, and includes a steel base plate 122 that is mounted on steel disc 103 of the rotation unit and which supports two steel mounting blocks 124 adjacent to the rear edge 126 thereof. Mounting brackets 128 and 130 are mounted on the steel plate and the mounting blocks respectively and support bottom tracks 132 thereon in a tilted orientation with respect to the base plate. A front tilt adjustor 134 is mounted on the bottom tracks adjacent to the front edge 136 thereof and a back tilt adjustor 138 is mounted on the bottom tracks adjacent to the rear edge 140 thereof. A spring 142 is mounted on the bottom track at a lower end and is connected to a top track 144, along with the pistons 146 and 148 of the front and back tilt adjustors 134 and 138 respectively. A seat adjustment control unit 150 is mounted on the top track, and a momentary push switch 152 is located at the rear of the top track. The momentary push switch is mounted on an angle bracket 154 connected to the steel base plate 122. A steel block 160 is connected to the seat and rides in channel 132. The travel of this block is limited by a steel plate 161 to control the range of motion of the seat. A steel stop element 162 extends from the base plate and contacts the momentary push switches 108 and 110 to operate those switches as above discussed. The seat adjusters 134 and 138 are worm gear assemblies driven by square cables 165 which are driven by an electric motor 167 via a transmission 169 in the manner common to operation and control of electric car seat units.

Mounting the seat using the front and back tilt adjusters as disclosed in FIG. 7A causes the seat to be level when the back tilt adjustor is all the way down and the front tilt adjustor is all the way up. This provides for maximum forward tilting of the seat (twelve degrees). The possible height adjustment ranges from zero to two inches, depending on how much tilt is being used. When the front and back tilt adjustors are all the way down (½ maximum tilt), the entire seat can be raised two inches. When the front of the seat is all the way down and the back is all the way up, height adjustment is not possible. This was a trade off made necessary in order to achieve maximum seat tilt. This is not a problem if the seat height is adjusted either by shimming under the rotational unit or selection of seat cushions so that when the seat is in this position it is at the proper height for playing the short irons.

The momentary push switch 152 is located so it will be triggered by the bottom plate 66 of the seat when the seat is all the way back. The bottom plate 66 mounts to the top of the top track 144. The switch 152 is closed when the seat is all the way back and is wired in series with two other switches that also sense seat position and controls the rotational motor 82. When the seat is all the way back and if the other two switches are closed, then the rotational motor 82 is enabled and the seat may be rotated. When the seat is moved forward from the rearmost position, the rotation unit is disabled so that rotation is not possible. The seat adjustment switches are mounted in a metal box to the top track of the left side of the seat.

The placement of the seat adjustment switches 150 on the left side of the seat is shown in FIG. 7C. This figure also shows the steel blocks fitted into the bottom track to mechanically stop the backward movement of the seat track. These are necessary because it is not desirable to use the full range of backward movement that the car seat is capable of. The momentary push switch 164 senses when the front of the seat is all the way up. When the seat is all the way up, the switch is closed enabling the rotation unit (provided the other two switches that are in series with switch 164, and must also be closed). When the front of the seat is lowered, the rotation unit motor is disabled by opening of the circuit. The front momentary push switch 164 is mounted in a bracket 166 attached to the upper track 144. Another bracket 168 is mounted on the lower track 132 and engages the switch 164 by pressing in the button when the seat front is raised into the all-the-way up position. Because the brackets are mounted on the seat tracks, both the switch and the brackets move with the track when the seat is adjusted forward or rearward.

Shown in FIG. 7D is the location of momentary push switch 170 which senses when the back of the seat is all the way down. When the back is down, the switch 170 is closed making rotation possible (provided the other two switches are closed). When the back is moved upward, the circuit is opened disabling the rotation motor. This switch is triggered by the plate which is mounted to the top of the top tracks. This plate is the base unit for the wheelchair seat. Switch 170 is mounted on the seat track so that when the seat is moved forward or back, it moves with it. As shown in FIG. 7D is switch 152 and control box 150.

The relative positions of the three momentary push switches 152, 166 and 170 are shown in FIG. 7B as well as control unit 150.

Automatic stopping when moving the seat backward is provided by the mechanical stop 160 that was added inside the lower track 132. The momentary push switches sense seat position so that rotation cannot occur unless the seat is in the proper orientation and position. This protects the cart, seat, and user from damage.

For the sake of reference, the seat unit, along with the rotation unit and the adjustment unit connected together and installed in the golf cart are shown in FIGS. 16 and 17.

Electrical Circuit

Shown in FIGS. 8A and 8B is electrical circuit 180 used to control the operation of the golf cart and the seat. The electrical system is powered from the cart power supply, such as the cart battery and is connected thereto in a normal manner. Therefore, only the modifications to the cart electrical system will be discussed, other connections are those that are commonly used in golf carts. The momentary push switches are shown in this circuit for reference, and operate as above discussed. These push switches are placed in series as above discussed with the seat rotation switch. When the three momentary push switches are closed (proper positioning of the set for rotation; seat front in the up position, seat back in the down position, and the entire seat moved back), the seat can be rotated from the playing orientation to the driving orientation and vice versa. The seat rotation circuit is disabled by opening any one of the three switches.

The seat adjustment circuit 182 contains the switches which operate the adjustment unit. A momentary push switch is located in series with the other switches of this circuit. In the drive orientation and while the seat is rotating, the momentary push switch is open, thereby disabling the seat adjustment switches. In the playing orientation, the momentary push switch is closed thereby enabling the seat adjustment switches.

One fuse is installed in each circuit. The circuit diagram shown in FIG. 8B shows a modification to the cart's ignition circuitry. A momentary push switch 110 is located in one of the ignition wires of this circuitry. This switch 110 is also operated by the seat whereby when the seat is in the drive orientation, switch 188 is closed thereby enabling the cart's ignition circuit. Rotating the seat out of the driving orientation immediately opens switch 110 thereby disabling the cart's ignition system.

The brake and acceleration system

Shown in FIGS. 9-12 are schematics of the braking and acceleration system associated with the golf cart of the present invention. In the present invention, the braking and acceleration systems of a known golf cart are modified to accommodate a single user who may not have use of his or her legs. Therefore, the brakes and accelerator of the present golf cart are operated using a single hand lever. As discussed above, since safety is important, especially when the golfer is in the golfing orientation, some of the modifications have been made to ensure that the golf cart will not move when the golfer is playing a shot. Unless otherwise mentioned, the braking and acceleration system of the present golf cart includes those elements normally found in a golf cart brake and acceleration system.

Referring first to FIG. 9A, the brake system of the present invention includes a brake box 190 formed of two legs 192 connected at their tops by a crosspiece 194 and each having an angle bracket 196 thereon adjacent to the bottom thereof. The brake box is mounted on the floor of the cart in the drop floor region by the brackets 196. An elongate slot (not shown in FIG. 9A) is defined through the crosspiece and a lever 198 extends through that slot into the interior of the brake box. The lever is best shown in FIGS. 9A, 9B and 10B and includes a distal end 200 with a hand grip 202 thereon, and a proximal end 204 located inside the brake box. The handgrip 202 is located to be accessible by a golfer driving the cart. The lever is pivotally mounted to the brake box by a pivot pin 206 extending across the box and connected to the lever by a fastener 208, such as a set screw or the like. Due to the placement of the fastener 208, moving the lever distal end one direction creates oppositely directed movement of the lever proximal end 204. The pivot pin 206 includes a head 210 on one end and a nut 212 on the other end.

Two guide ends 214 are attached to the lever above the pivot pin by a pin 216 and yoke 218. Each of the guide ends rides on a track 220, with each track being mounted on the inner surface of one of the legs 192 by bolts 222 and 224. The tracks are identical and each has a top edge 226 on which the guide ends slide. Each track has a hook-shaped cutout 230 defined therein with an entrance section 232 connecting a seating section 234 to the track top edge. The cutout is angled with respect to the top edge whereby the entrance section has an edge 236 shaped as a reverse curve and a lip 238. The section 234 is sized to accommodate the pin 216 and the edge 236 is sized to be longer than the diameter of the pin 216. This sizing requires the pin to be moved from section 234 and lifted upwardly to move back to the track top edge from the seating section 234. As will be understood from the ensuing discussion, the dual nature of this release movement ensures safe operation of the cart as accidentally releasing a brake is, if not totally precluded, at least is made less probable.

As can also be seen in FIGS. 9A and 10B, the pin 216 is biased downwardly by two springs 240. Each of the springs is connected at one end thereof to the pin 216 near an outer end of that pin and at the other end thereof to the lever adjacent to the proximal end 204. The springs are connected to the lever by a yoke connection having plates 242 connected to the springs, and by a bolt 244, to the lever. Movement of the lever causes the guide pin to slide along the top edge of the tracks and the spring bias maintains the pin on the top of the tracks. When the pin is aligned with the entrance section 232, it drops into the slot 230 and will remain there until the aforementioned dual movements of rearward and upward movement of the pin are executed.

The pin is lifted upwardly by release cable 250 connected at a lower end thereof to the pin 216 by a yoke 252 and at an upper end thereof to a lower end of a lever handle 254. The lever handle is pivotally mounted on mount 256 attached to the lever 198 so it will pull cable 250 in an upward direction when the lever handle is pulled in direction 258. The cable 250 is encased to protect that cable and to prevent binding of that cable.

As best shown in FIGS. 10B and 9A, a brake control cable 260 is connected to lever distal end 204 by plates 262 and bolt 264. The bolt 264 includes a head 266 on one end and a cotter unit 268 on the other end thereof, and the plates are attached to the lever by a bolt 270. The cable 260 is connected to the lever 198 in a manner that prevents binding of the cable 260 during operation of the brake unit and includes a lock 271 to connect one end of the cable to the remainder thereof. The bolt through the lever uses a locking nut so that it is not bolted too tight to the lever arm and can turn in the lever arm. The brake cable is adjusted so that the brakes can be applied and even fully locked without setting the parking brake (dropping the pin 216 into the slots 230). The parking brake is set by moving the lever 198 forward until the pin 216 drops into the slots 230.

As can be understood, once the parking brake is set, merely moving the hand element 254 will only cause the pin 216 to slide forward along edge 236, and then drop back under the bias of the springs as the top edge 226 is higher than the diameter of the pin. Also, upward movement of the pin 216 is prevented by the overhanging edge 238 that binds that pin. Thus, two movements must be executed to release the parking brake: a first forward movement of the pin 216 along edge 236, and then, an upward movement out of the slot using the release cable 250. In the preferred form of the invention, the lever arm must move forward 5.6 inches at the hand level and twenty-three to twenty-five pounds of force must be applied to the lever to lock the parking brake. To release the parking brake, twenty-three to twenty-five pounds of forward pressure must be applied to the lever arm while the lever handle is pulled in direction 258. In the preferred form of the invention, there are three inches between the pivot point and the mounting of the cable 260. The lever 198 must move back 5/8 inch at the bottom to lock the parking brake, and the overall length of the lever 198 is thirty inches.

While the brake box is shown as being open in FIG. 9A, it is covered by sheet metal when installed in the golf cart.

As shown in FIG. 9B, the hand controls are similar to that of a motorcycle. A mounting element 273 includes a round section 272 and a rectangular section 274. The mounting element is fastened, as by welding, to the block 256 along edge 276 of the section 274, and a hole 278 is defined through the element in the circular section 272. The section 274 is attached to the side of the block 256 in a rear view as appears in FIG. 9B. A cable 280 extends through the hole 278 and has a knob 282 on one end thereof and is connected to an accelerator unit on the other end. A catch piece 284 is fixed to the hand lever 254 for movement therewith and the cable 280 extends through the catch piece 284.

Initial movement of the lever 198 and the hand lever in direction 258 releases the brake as above discussed. Then, further movement of the hand lever in direction 258 causes the catch element 284 to contact the knob 282 and move that knob upwardly. As will be discussed below, such upward movement of the knob will start the engine of the golf cart.

The brake cable system is shown in FIG. 11 and includes steel cable 260 connected at one end to a clevis 292 and to the brake lever 198. Slot 290 defined in brake box top 194 is shown in FIG. 11. The cable 260 extends into a casing 294 attached at one end to a first mounting element 296 and at the other end to a second mounting element 298. The mounting elements are fixed to the frame unit of the cart.

The clevis 292 is attached to a crosspiece 300 to which brake cables 302 are attached at one end thereof. The other ends of the brake cables 302 are attached to the brake shoes of the cart braking system in a manner such that movement of the brake cables activates the brake shoes to stop the wheels of the cart. As can be seen in FIG. 11, two holes are drilled in an upright section of each mounting elements 296 and 298, one hole for the case 294 and one for the brake cable 260. The case has grease in it so the cable 260 can move without binding. Element 298 is fixed to the cart frame where the foot pedal mechanism was mounted and replaces that mechanism. Element 296 is located in the drop floor region of the cart as is the brake box. A lock 271' is also used to secure the cable 260 to the clevis.

Accelerator Mechanism

Shown in FIG. 12 is an element in the accelerator mechanism of the present golf cart. The accelerator mechanism of the present invention is incorporated into the accelerator system existing in the golf cart. The existing accelerator system includes a mounting housing 320 fixed to the floor board 322 of the golf cart on the left side of that cart and beneath that floor board. By hooking in at this point instead of at the carburetor, the inventors are able to make use of the existing kill switch which disables the ignition system whenever the accelerator is not activated. The accelerator pedal, which had been attached to the splined section 324 of the pin 326, is removed. Cable 328 is attached at one end thereof to the pin 326 and at the other end thereof to the carburetor linkage. The carburetor is operated by the cable 328 in the manner common to such elements.

Cable 280 is attached to the pin 326 at one end and is attached to the hand control knob 282 at the other end thereof. The cable 280 is attached to the pin by a block 330 resting against that pin and having a cable receiving slot therein. A set screw 332 is threadably mounted on the block 330 and fixes the cable to the block and via the block to the pin 326. A cable housing stop 334 controls movement of the cable 280 to prevent binding. A return spring 338 is connected at one end thereof to the pin 326 and at the other end thereof to a mounting plate 298 fixed to the frame unit and controls rotation of the pin 326.

Steering mechanism

Shown in FIGS. 13A and 13B is the steering mechanism 12. The existing steering mechanism of a golf cart is modified in the present invention to move the steering to the right side of the cart. The steering mechanism 12 includes a frame unit 350 mounted on the floor of the golf cart frame element in the drop floor area of that cart. The frame unit 350 includes two legs 352 and a crosspiece 354 on which a plate 356 is mounted. The plate is shown cutaway in FIG. 13B for clarity. The steering column 40 mounted on the plate contains shaft 357 which extends through that plate and has a steering wheel 358 on one end and a sprocket 360 on the other end for rotation therewith. A collar 362 mounts the sprocket to the steering column via a set screws 364. Suitable bushings are also included (but are not shown) for permitting proper rotational movement of the shaft 357 in the plate 356. The steering column is sized to provide convenient movement into and out of the cart as well as proper swing movement.

A drive chain 370 is trained around the sprocket 360 to be driven by rotation of the steering shaft. The drive chain is drivingly connected to a driven gear 372 that is drivingly attached to a shaft 374. The shaft rotates with movement of the drive chain, and is connected through suitable gearing to the wheels of the cart. The gear 372 is connected to the shaft 374 by a collar 376, and the shaft extends into a sector box 380. Set screws 382 connect the shaft to the collar. The shaft 374 extends parallel to the steering column 40.

Seat Region

Shown in FIG. 14 is a top plan view of the seat region of the golf cart of the present invention. The front of the cart is indicated in FIG. 14 at area 390, and indicates the region of the cart fiberglass body that has been removed to accommodate the seat unit. This figure also shows the heavy steel channel 30 added to the right side of the cart, and a metal plate 392 that has been added between the side channel and the main frame. Two thin regions at the front and back ends are angle irons 394 which support the front and back edge of the plate.

Golf Club Rack

Shown in FIGS. 15A and 15B is golf club rack 14. Rack 14 is mounted on the front of the cart and is tilted back towards the rear of the cart so a golfer can remove and replace a club in a golf bag stored on the rack without leaving the driver's seat of the cart. The rack includes horizontal mounting bars 392 that are fixed at one end thereof to the cart frame adjacent to the front panel of the golf cart and extend through the front panel horizontally forward and outward from that front panel. The rack further includes two vertical mounting bars 404 that have a lower end thereof mounted on the front bumper adjacent to the front panel of the golf cart and which extend upwardly from the bumper. An L-shaped bag support element 396 includes a long leg 398 connected as by welds WF or fasteners FS to the mounting bars 392 and 404, respectively, to tilt rearwardly from a short leg 400 back toward the rear of the golf cart. Angle iron 402 is attached to the short leg and extends from that plate to keep a golf club bag in place on the rack. Suitable straps (not shown) are included to hold the club bag on the rack.

Summary

In summary, the golf cart embodying the present invention allows an ambulatory disadvantaged person to play golf. The golf cart includes a seat which is a modified wheelchair seat which faces in a forward position for driving and which rotates to the right side 90° and then moves up and down and tilts to position the golfer for the shot. The tilting of the seat will move the golfer's legs and feet out of the way of the golf swing because they are in a flat sitting position° Height adjustment allows the golfer to line up so that the bottom of the club face is parallel to the ground. By providing forward seat movement, the golfer will be able to compensate for variance in cart position when lining up with the ball. With these seat adjustments, the golfer will be able to achieve a more natural golfing position and can accurately address the ball no matter what the terrain is or what length of club he uses. The seat incorporates safety switching to eliminate accidental cart motor starting while the golfer is moving into position or while he is hitting a shot.

It is understood that while certain forms of the present invention have been illustrated and described herein, it is not to be limited to the specific forms or arrangements of parts described and shown.

We claim:

1. A golf cart for use by an ambulatory disadvantaged golfer comprising:
   A) a frame unit that includes a front end, a rear end, a left side and a right side;
   B) a drive means mounted on the frame unit for moving the golf cart, said drive means including a single hand controllable lever arm for controlling acceleration and braking of the golf cart;
   C) a steering mechanism on the frame unit;
   D) an ignition circuit connecting said drive means to a power source;
   E) a seat unit adjacent to said steering mechanism and including
      (1) a seat having a back element and a seat element,
      (2) a rotational unit attached to the frame unit and including a motor, a gear assembly connected to the motor and to the seat element, control means connecting said motor to the power source for activating said motor to rotate said seat unit between a drive orientation facing toward the front end of the frame unit and a playing position facing toward the right side of the frame unit, said seat facing forward in said drive orientation and facing sideways in said playing orientation, stop means for stopping rotation of said seat, and
      (3) seat adjustment means on said seat for tilting said seat toward the frame unit side, moving the seat toward the frame side and adjusting the height of the seat element with respect to ground level; and
   F) control means connected to said seat adjustment means and to said rotational unit to disable said seat adjustment means while said rotational unit is activated and to disable said ignition circuit when said seat is not in said drive orientation and for disabling said seat adjustment means when said seat is not in said playing orientation, and for disabling said rotational unit when said adjustment means is operating.

2. The golf cart defined in claim 1 further including golf club carrying means on said frame unit adjacent to said frame unit front end.

3. The golf cart defined in claim 1 further including a brake system that includes a brake box on said frame unit, a lever having a distal end located in said brake box, and a hand grip on a proximal end of said lever, a pivot pin mounted on said brake box, said lever being pivotally mounted on said brake box by said pivot pin to move forward and rearward with respect to said brake box, a guide pin mounted on said lever to move with said lever, a spring having one end connected to said lever adjacent to said distal end and a second end connected to said guide pin, said spring biasing said guide pin toward said distal end, a guide track mounted on said brake box adjacent to said lever, said guide track having a top edge, said guide pin sliding on said guide track as said lever moves forward and rearward, said guide track having a slot defined therein, said slot extending from said guide track top edge and being sized to receive said guide pin when said guide pin is aligned with said slot, a cable means connected at one end to said guide pin and at another end to a cable hand lever for pulling said guide pin out of said slot when said cable hand lever is moved, and a brake cable connected to said lever distal end and to a brake unit of the golf cart to operate that brake unit.

4. The golf cart defined in claim 3 wherein said slot includes an entrance section connected to said guide track top edge and a pin accommodating section and a lip overhanging said pin accommodating section, said pin accommodating section being spaced from said top edge by a distance that exceeds the outer dimension of said guide pin.

5. The golf cart defined in claim 4 further including two guide tracks and two springs.

6. The golf cart defined in claim 1 further including an accelerator system that includes a cable connected to a carburetor of the golf cart and controls operation of the motor of the golf cart via said carburetor, a pivot pin connected to said cable, a second cable connected to said pivot pin to rotate said pivot pin, a hand grip connected to said second cable and a spring attached to said pivot pin.

7. The golf cart defined in claim 6 wherein said hand grip is located to operate said second cable when the brake unit has been released.

8. The golf cart defined in claim 1 wherein said adjustment means includes a first support plate, a lower track, a forward tilt mechanism mounted on said lower track and connected to said first support plate, a rear tilt mechanism mounted on said lower track and connected to said first support plate, a spring mounted on said lower track and connected to said first support plate, and a plurality of push switches.

9. The golf cart defined in claim 1 wherein said control means includes first push switches adjacent to said rotational unit and second push switches adjacent to said seat adjustment means.

10. The golf cart defined in claim 1 wherein said drive orientation is spaced 900 from said playing orientation.

11. The golf cart defined in claim 1 wherein said rotation means includes a first support plate, a second support plate, legs connecting said first and second support plates together, a motor mounted on said first support plate and connected to a source of power, a first gear connected to said motor, a second gear connected to said first gear, a drive shaft connected to said second gear for rotation-therewith, a sprocket connected to said drive shaft for rotation therewith, a chain connected to said sprocket, a mounting plate rotatably mounted on said second support plate and having a second sprocket thereon that is connected to said chain to rotate said mounting plate, and control switches mounted on said second support plate.

12. The golf cart defined in claim 1 wherein said seat element includes shims on said seat element.

13. The golf cart defined in claim 1 wherein said seat adjustment means includes an electric motor.

14. The golf cart defined in claim 1 further including a steering mechanism that includes steering means connected to wheels on said frame unit, a first sprocket on said steering means, a drive chain, a shaft in a steering column located on the right hand side of said frame unit, a second sprocket on said shaft, said drive chain being connected to said first and second sprockets whereby rotation of said shaft operates said steering means to turn the wheels.

15. The golf cart defined in claim 1 wherein said rotational unit means includes limit switches for automatically stopping the seat unit in the driving and playing positions.

16. The golf cart defined in claim 1 further including means on said lever for activating the golf cart ignition circuit when said lever is further squeezed.

17. The golf cart defined in claim 1 wherein said control means disables said seat adjustment means when said seat is in said driving orientation.

* * * * *